United States Patent [19]

Soumiya et al.

[11] Patent Number: 4,769,351
[45] Date of Patent: Sep. 6, 1988

[54] HYDROTHERMAL PROCESS FOR PREPARING ZIRCONIA-ALUMINA BASE ULTRA-FINE POWDERS OF HIGH PURITY

[75] Inventors: Shigeyuki Soumiya, 7-19, Seijyo 3-chome, Setagaya-Ku, Tokyo; Masahiro Yoshimura, Ayase; Zenjiro Nakai, Saitama; Kazumitsu Hishinuma; Takao Kumaki, both of Kumagaya, all of Japan

[73] Assignees: Chichibu Cement Co., Ltd.; Shigeyuki Soumiya, both of Tokyo, Japan

[21] Appl. No.: 45,564

[22] Filed: May 4, 1987

[30] Foreign Application Priority Data

May 6, 1986 [JP] Japan ................................. 61-103185

[51] Int. Cl.$^4$ ........................ C04B 35/10; C04B 35/48
[52] U.S. Cl. .................................... 501/105; 501/103; 423/21.1; 423/71; 423/81; 423/115; 423/85; 423/123; 252/315.7
[58] Field of Search ......................... 501/105, 103, 12; 423/21.1, 71, 81, 85, 115, 123; 252/315.7

[56] References Cited

U.S. PATENT DOCUMENTS

| | | | |
|---|---|---|---|
| 4,314,827 | 2/1982 | Leithauser et al. | 501/105 |
| 4,605,631 | 8/1986 | Rossi | 501/103 |
| 4,619,817 | 10/1986 | Stambaugh et al. | 501/103 |

Primary Examiner—Steven Capella
Assistant Examiner—David M. Brunsman
Attorney, Agent, or Firm—Staas & Halsey

[57] ABSTRACT

A process for preparing a zirconia-alumina base composite ultra-fine powder is described, including the steps of: mixing an aluminum salt or an alumina hydrate with an aqueous zirconium oxychloride solution, with or without metal salt acting as a stabilizer; mixing urea or a substance capable of generating ammonia by hydrolysis with the resulting mixture; and allowing the mixture to react at a temperature of 140° to 300° C. and a pressure of 4 to 150 kg/cm$^2$ in a high-temperature and -pressure vessel. The reaction product is further dried, calcined and crushed to obtain an ultra-fine powder.

8 Claims, 1 Drawing Sheet

HYDROTHERMAL PROCESS FOR PREPARING ZIRCONIA-ALUMINA BASE ULTRA-FINE POWDERS OF HIGH PURITY

BACKGROUND OF THE INVENTION

The present invention relates to a process for preparing zirconia-alumina base composite powders and, more particularly, to a hydrothermal process for preparing zirconia-alumina base composite ultra-fine powders of high purity.

Zirconia-alumina base composite ceramics including an alumina matrix with zirconia dispersed therein are referred to as zirconia toughened alumina, which have for their object the improvement of the toughness of alumina. Zirconia toughened alumina finds use in cutting tools and engineering material applications due to the fact that their toughness is higher than that of conventional alumina ceramics.

Conversely, alumina-dispersed zirconia, in which alumina is dispersed throughout a matrix of partially stabilized zirconia or tetragonal zirconia, is used to reduce the weight, increase the hardness and minimize the cost of high-toughness zirconia ceramics.

Conventionally, zirconia-alumina base composite powders have been prepared by mechanical mixing using a ball mill, etc. However, it has been found that considerable difficulty is involved in homogeneous mixing of fine powders, which are of the submicron order and which excel in sinterability, by such mechanical means.

There has also been proposed a process wherein mixed precipitates are obtained from a solution containing zirconium and aluminum components by neutralization/co-precipitation, calcination and pulverization. It has been noted, however, that the composition of the mixed precipitates fluctuates, partly because the concentration of ammonia used as the precipitant varies locally, and partly because the precipitation conditions vary at the initial and final stages. For these reasons, delicate differences in the operation conditions have led to large differences in the properties of the precipitant.

In recent years, techniques using hydrothermal oxidation, gas-phase reaction and plasma have also been developed for preparing highly homogeneous zirconia-alumina base composite fine powders; however, these techniques are characterized by high costs and low productivity.

SUMMARY OF THE INVENTION

A main object of the present invention is to solve the aforesaid problems of the prior art.

According to the present invention, this object is achieved by providing a novel hydrothermal process for preparing zirconia-alumina base composite ultra-fine powders of high purity, including the steps of: dissolving or suspending an aluminum salt (e.g., aluminum chloride) or an alumina hydrate (e.g., boehmite and gibbsite) in an aqueous zirconium oxychloride solution with or without a stabilizer such as a salt of a metal such as yttrium; adding urea or a substance capable of generating ammonia by hydrolysis (e.g., hexamethylenediamine) to the resulting solution or suspension; and hydrothermally treating the resulting solution or suspension.

BRIEF DESCRIPTION OF THE DRAWING

The aforesaid and other objects and features of the present invention will become apparent from the following detailed description of the present invention with reference to the accompanying single drawing, in which.

DETAILED DESCRIPTION OF THE PREFERRED EMBODIMENTS

Figure 1:
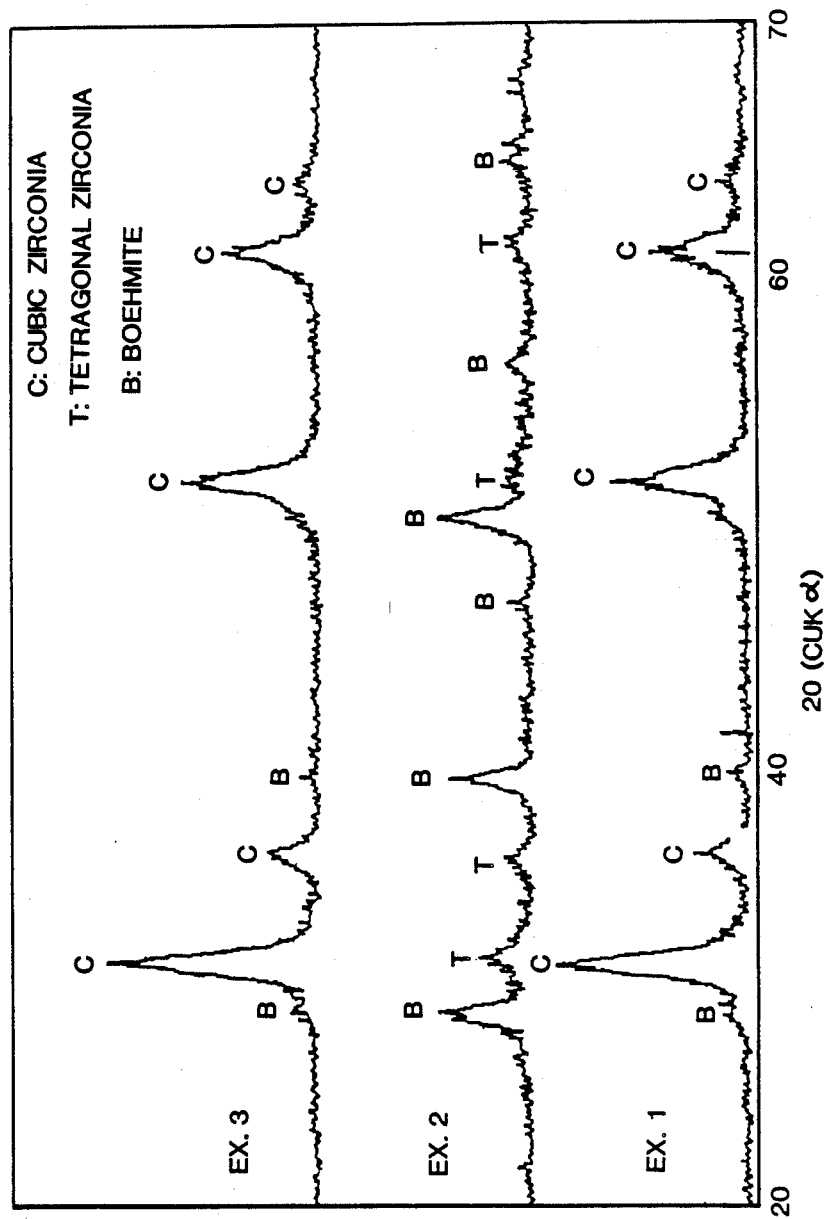
FIG. 1 is an X-ray diffraction chart of the reaction products of Examples 1, 2 and 3.

According to a preferred embodiment of the present invention, there is provided a process for preparing a zirconia-alumina base composite ultra-fine powder slurry comprising the following steps. First, an aluminum salt or an alumina hydrate is dissolved or suspended in an aqueous zirconium oxychloride solution. A metal salt can be added to act as a stabilizer, if desired. Second, urea or a substance capable of generating ammonia by hydrolysis is mixed with the resulting solution or suspension. Third, the thus obtained mixture is hydrothermally treated by allowing it to react at a temperature of 140° to 300° C. and a pressure of 4 to 150 kg/cm$^2$ in a high-temperature and high-pressure vessel such as an autoclave. Finally, the thus obtained reaction product is dehydrated/dried, calcined and crushed.

The pH of the solution at the time of completion of the reaction may be regulated by varying the amount of urea added. The zirconia-alumina base composite ultra-fine powders may be prepared over a wide pH range. However, when the salt of a metal such as yttrium is added as a stabilizer to form a solid solution, the pH should be equal to, or higher than 6. It is to be understood that the lower limit of pH varies depending upon the type of stabilizer used.

It is also possible to control the particle size and shape of the reaction product depending upon the conditions for hydrothermal treatment applied and the concentration of aqueous solution used. A hydrothermal treatment temperature below 140° C. results in a lowering of the crystallizability of the reaction product, and requires a longer reaction time with a drop in productivity. A temperature exceeding 300° C. causes vigorous corrosion of the high-temperature and -pressure vessel, which offers a problem in view of practicality. It is to be noted that the pressure to be applied is determined depending upon the temperature applied and the amount of urea added.

The reaction product obtained by this hydrothermal treatment is in the form of slurry, and the anions, water and insoluble impurities contained therein are washed out by centrifuging or filtration, using de-ionized water and ammonia water.

After washing, the slurry or filter cake is dehydrated and dried by known means such as spray drying, hot-air drying, vacuum drying or freeze drying. In some cases, hot-air drying may give rise to strong agglomeration of the slurry or filter cake. However, the agglomeration obtained with hot air drying is less than that occurring when the neutralization/coprecipitation technique is applied. Strong agglomeration can be avoided by dehydration with an organic solvent, etc. Use of a dispersant is also effective for the prevention of strong agglomeration.

Depending upon the intended purpose for the powder and the forming method to be applied to the powder, the dried product may be calcined at a suitable temperature and crushed with a ball mill, stirring mill or like means.

The slurry can also be cast directly into a formed body. In this case, there are the advantages that the steps of drying, calcination and crushing are dispensed with, and that all the steps from the formulation of the raw material to the production of formed bodies can be effected in a wet manner.

The process for preparing zirconia-alumina base composite ultra-fine powders according to the present invention makes it possible to obtain zirconia-alumina base composite ultra-fine powders of high purity and 0.5 μm or smaller particle size in larger amounts and at lower costs, as compared with conventional processes, and therefore can be effectively applied on an industrial scale.

The mixing ratio of zirconia with alumina may be selected as desired. Sole use of zirconia or alumina gives ultra-fine powders of monoclinic zirconia or boehmite. In this connection, the systems comprising zirconia and stabilizers added thereto are disclosed in Japanese Patent Laid-Open (Kokai) Publication No. 60-103033. When the amount of zirconia exceeds 30% by volume according to the present invention, it is desired that a stabilizer such as yttrium chloride be added to the starting aqueous solution to partially stabilize the zirconia.

Without further elaboration, it is believed that one skilled in the art, using the preceding description, can utilize the present invention to its fullest extent. The following examples are therefore to be construed as merely illustrative, and not limitative in anyway whatsoever, of the remainder of the disclosure.

EXAMPLE 1

One hundred and eighty-nine (189) g of $ZrOCl_2.8H_2O$, 91 g of $AlCl_3.6H_2O$ and 11 g of $YCl_3.6H_2O$ were weighed out and dissolved in de-ionized water to obtain 1000 ml of an aqueous solution. Then, 600 ml of the aqueous solution was dispensed, and 52 g of urea was added thereto to obtain the starting material, which was in turn hydrothermally treated in an autoclave having an internal volume of 1000 ml under the following conditions.

| Conditions For Hydrothermal Treatment | |
| --- | --- |
| Temperature | 200° C. |
| Pressure | 75 kg/cm² |
| Treating Time | 10 hours |

The product obtained by the aforesaid hydrothermal treatment was centrifuged and subjected to repeated dehydration and washing with water. After the water had been substituted with ethanol, the thus obtained product was dried at 120° C. for 12 hours to obtain 80 g of ultra-fine powder of 80 weight % of zirconia (containing 3 mol % of yttria)-20 weight % of alumina.

As is seen from the X-ray diffraction results shown in FIG. 1, the thus obtained powder showed the diffraction pattern of cubic zirconia. Observation under a transmission electron microscope indicated that the particle size was extremely fine as expressed in terms of 10 nm (100 Å), and that the ultra-fine powders of zirconia were homogeneously mixed with those of boehmite. A DTA curve showed an endothermic peak at 500° C. with weight losses. This is due to the phase transformation of boehmite to γ-alumina. Calcination of the powder at 1000° C. gave an ultra-fine powder which was rich in sintering activity and in which tetragonal zirconia was homogeneously mixed with $\theta$ and $\sigma$-alumina. Such powders were formed at 2 t cm² using a rubber press, and were then sintered at 1450° C. for 2 hours to obtain a sintered body of 5.5 g/cm³ in density and 1000 MPa in bending strength.

EXAMPLE 2

Thirty (30) g of $ZrOCl_2.8H_2O$ and 219 g of $AlCl_3.6H_2O$ were weighed out and dissolved in de-ionized water to prepare 1000 ml of an aqueous solution. Added to 600 ml of that solution was 84 g of urea to obtain the starting material, which was in turn hydrothermally treated in an autoclave having an internal volume of 1000 ml under the following conditions:

| Conditions For Hydrothermal Treatment | |
| --- | --- |
| Temperature | 200° C. |
| Pressure | 60 kg/cm² |
| Treating Time | 5 hours |

The product obtained by the aforesaid treatment was centrifuged and subjected to repeated dehydration and washing with water. After the water was substituted with ethanol, the product was dried at 120° C. for 12 hours to obtain 67 g of ultra-fine powders of 20 weight % of zirconia-80 weight % alumina.

As will be seen from the X-ray diffraction results shown in FIG. 1, the thus obtained powder showed the diffraction pattern of tetragonal zirconia. The powder was calcined at 1000° C. to obtain a powder in which tetragonal zirconia was homogeneously mixed with $\theta$ and $\sigma$-alumina. The powder was found to be ultra-fine and rich in sintering activity.

EXAMPLE 3

Two hundred and sixty-three (263) g of $ZrOCl_2.8H_2O$, 15.6 g of yttrium chloride $0.6H_2O$, 23 g of boehmite and 77 ml of 12N HCl were weighted out and formulated into 1000 ml of an aqueous solution. Added to 600 ml of that solution was 47 g of urea to obtain the starting material, which was in turn hydrothermally treated in an autoclave having an internal volume of 1000 ml under the following conditions:

| Conditions For Hydrothermal Treatment | |
| --- | --- |
| Temperature | 220° C. |
| Pressure | 70 kg/cm² |
| Treating Time | 10 hours |

The product obtained by the aforesaid treatment was centrifuged and subjected to repeated dehydration and washing with water. After the water was substituted with ethanol, the product was dried at 120° C. for 12 hours to obtain 80 g of an ultra-fine powder of 82 weight % zirconia (containing 3 mol % of yttria)-18 weight % of alumina. As will be seen from FIG. 1, the ultra-fine powders were identified as cubic zirconia by X-ray diffraction.

The foregoing is considered illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to which fall within the scope of the invention and the appended claims.

What is claimed is:

1. A process for preparing a zirconia-alumina base composite ultra-fine powder, comprising the steps of:
   (a) mixing an alumina matrix, selected from the group comprising an aluminum salt and an alumina hydrate, with an aqueous zirconium oxychloride solution;
   (b) adding a metal salt as a stabilizer;
   (c) adding a substance capable of generating ammonia by hydrolysis to the resulting mixture; and
   (d) allowing the mixture to react in a high temperature, high pressure vessel at a temperature of 200° to 220° C. and a pressure of 60–75 kg/cm$^2$ from between 5 to 10 hours to form a homogeneous reaction product.

2. The process as recited in claim 1, further comprising the steps of:
   (d) drying the reaction product;
   (e) calcinating the reaction product; and
   (f) crushing the reaction product.

3. The process as recited in claim 1, wherein the substance capable of producing ammonia by hydrolysis is urea.

4. The product as recited in claim 1, wherein the aluminum salt is aluminum chloride, the alumina hydrate is selected from the group comprising boehmite and gibbsite, and the substance capable of generating ammonia is hexamethylenediamine.

5. The process as recited in claim 2, wherein the aluminum salt is aluminum chloride, the alumina hydrate is selected from the group comprising boehmite and gibbsite, and the substance capable of generating ammonia is hexamethylenediamine.

6. The process as recited in claim 1, wherein step (c) occurs in an autoclave.

7. The process as recited in claim 2, wherein step (c) occurs in an autoclave.

8. The process as recited in claim 2, wherein zirconia in the reaction product is in the range of 20–82% and alumina in the reaction product is in the range of 18–80%.

* * * * *

UNITED STATES PATENT AND TRADEMARK OFFICE
CERTIFICATE OF CORRECTION

PATENT NO. : 4,769,351

DATED : Sep. 6, 1988

INVENTOR(S) : Soumiya et al.

It is certified that error appears in the above-identified patent and that said Letters Patent is hereby corrected as shown below:

Column 4,
Line 2, delete "2 t cm$^2$" and insert --2 t/cm$^2$--.

Column 6,
Line 4, delete "product" and insert --process--.

Signed and Sealed this

Seventeenth Day of January, 1989

Attest:

DONALD J. QUIGG

*Attesting Officer*   *Commissioner of Patents and Trademarks*